March 7, 1944.  H. A. KNOX  2,343,301

HYDRAULIC CHECK

Original Filed Jan. 6, 1942   3 Sheets-Sheet 1

Inventor
Harry A. Knox
By G. J. Kessenich & W. E. Thibodeau
Attorneys

March 7, 1944.   H. A. KNOX   2,343,301
HYDRAULIC CHECK
Original Filed Jan. 6, 1942   3 Sheets-Sheet 2
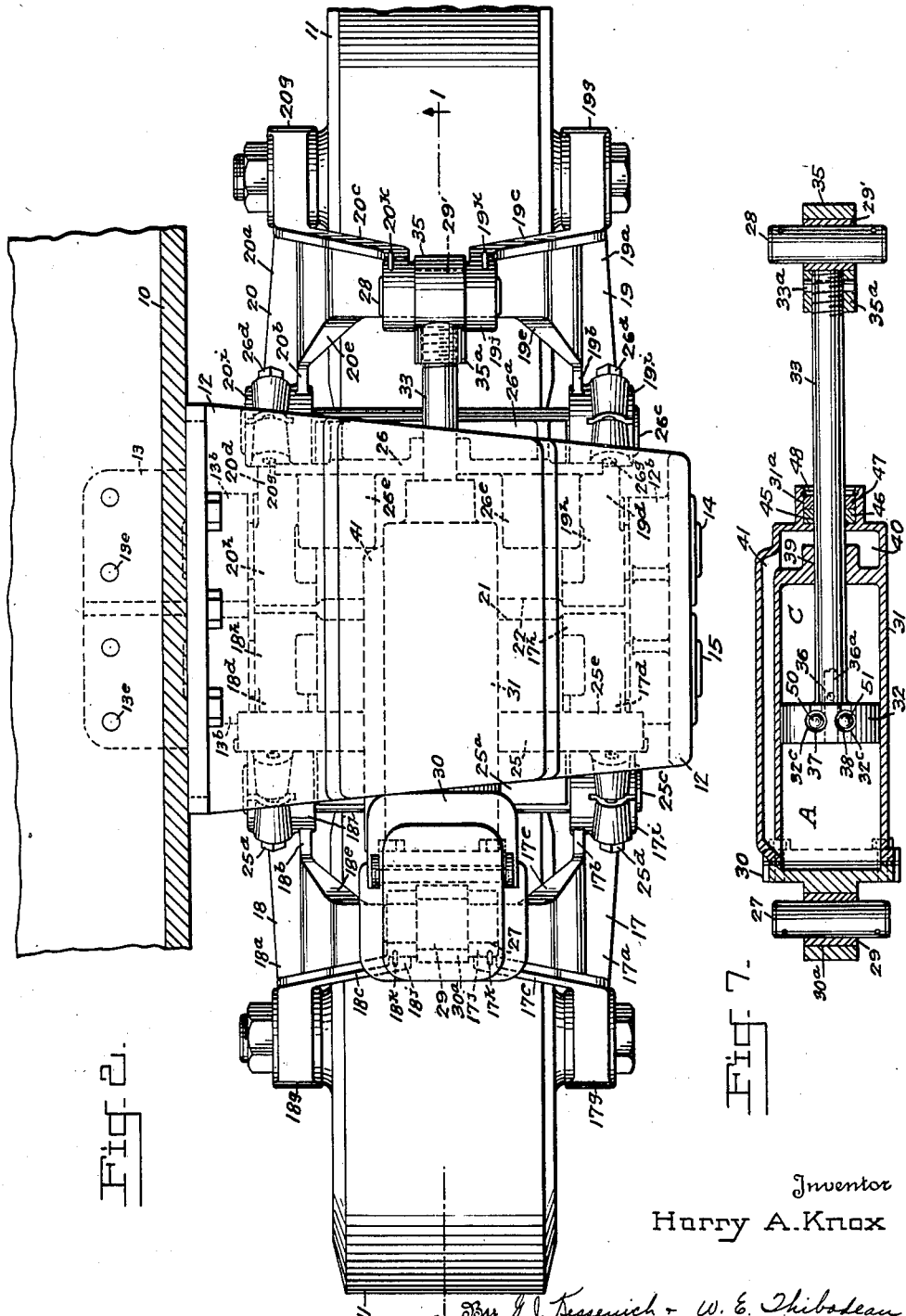
Inventor
Harry A. Knox
By J. J. Kessenich & W. E. Thibodeau
Attorneys March 7, 1944.  H. A. KNOX  2,343,301
HYDRAULIC CHECK
Original Filed Jan. 6, 1942  3 Sheets-Sheet 3
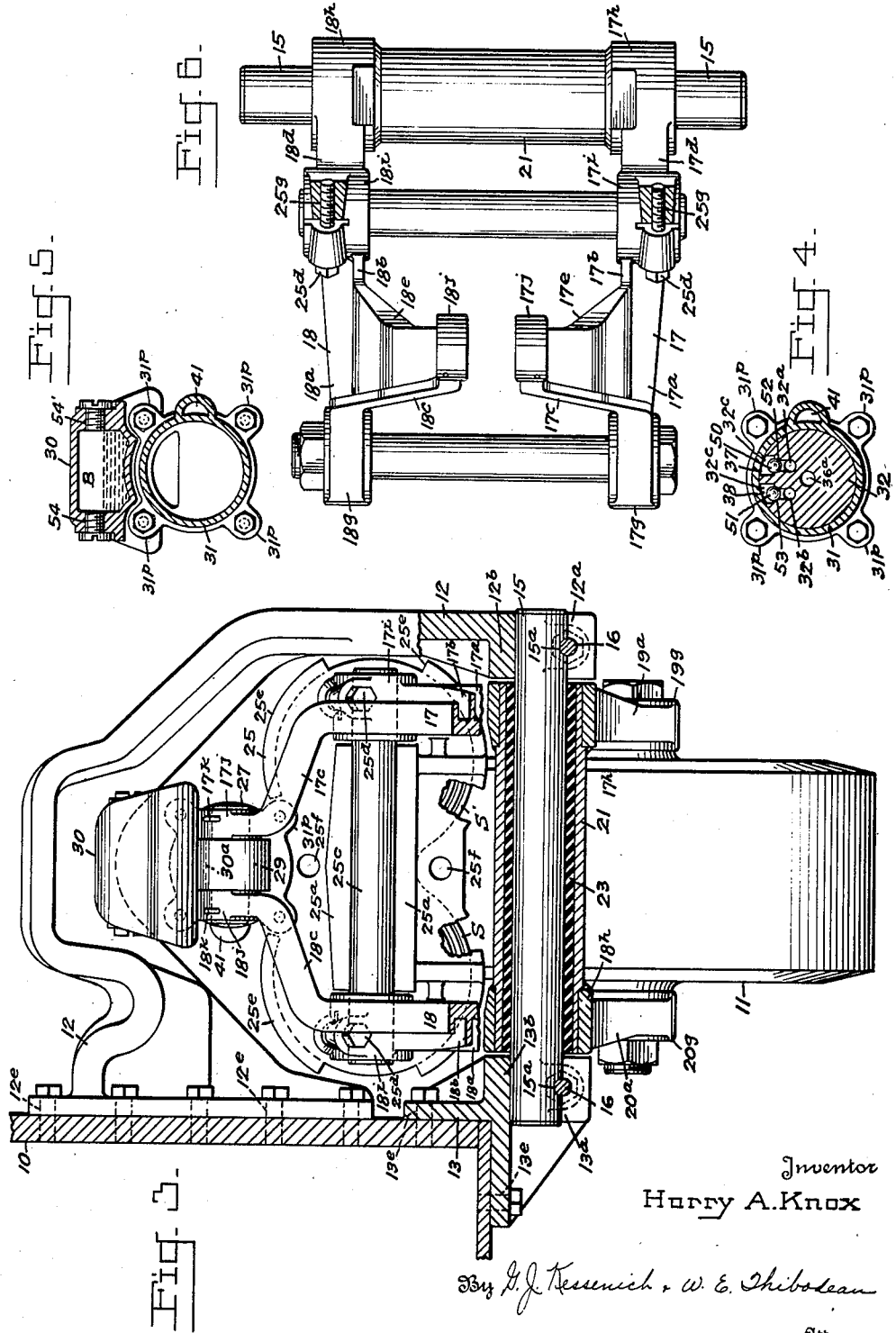
Inventor
Harry A. Knox
By G. J. Kessenich & W. E. Thibodeau
Attorneys Patented Mar. 7, 1944

2,343,301

UNITED STATES PATENT OFFICE 2,343,301

HYDRAULIC CHECK

Harry A. Knox, Washington, D. C.

Original application January 6, 1942, Serial No. 425,717. Divided and this application September 7, 1942, Serial No. 457,596

1 Claim. (Cl. 280—124)

(Granted under the act of March 3, 1883, as amended April 30, 1928; 370 O. G. 757)

The invention described herein may be manufactured and used by or for the Government for governmental purposes, without the payment to me of any royalty thereon.

This is a division of my copending application Serial No. 425,717, filed January 6, 1942.

This invention relates to a suspension for vehicle wheels having means for checking abnormal movement of the wheels.

An object of this invention is to provide a resilient wheel suspension incorporating a hydraulic check.

Another object of this invention is to provide a resilient supporting means for wheels of a vehicle incorporating therein apparatus for causing the wheels to have a greater resistance to movement in one direction than in the other.

Another object of this invention is to provide hydraulic means for controlling the movement of the wheels of a track laying vehicle.

Another object of this invention is to provide a wheel suspension for track laying vehicles in which spring means are combined with hydraulic means so as to absorb large amounts of road shock with a relatively small amount of discomfort to the occupants.

Another object of this invention is to provide an improved fluidtight connection between a fluid cylinder and a piston rod.

Another object of this invention is to provide an improved check valve mounted in a piston of a fluid cylinder.

The specific nature of the invention as well as other objects and advantages thereof will clearly appear from a description of a preferred embodiment as shown in the accompanying drawings in which:

Fig. 2 is a plan view of the suspension and hydraulic check and a portion of the supporting means in section.

Fig. 3 is a view taken substantially on line 3—3 of Fig. 1.

Fig. 4 is a view taken substantially on line 4—4 of Fig. 1.

Fig. 5 is a view taken substantially on line 5—5 of Fig. 1.

Fig. 6 is a plan view of one of the wheel supporting arms detached from the hydraulic check; a portion of the clamping means for contact shaft 25c is shown in section.

Fig. 7 is a view taken substantially on line 7—7 of Fig. 1.

Figure 1:
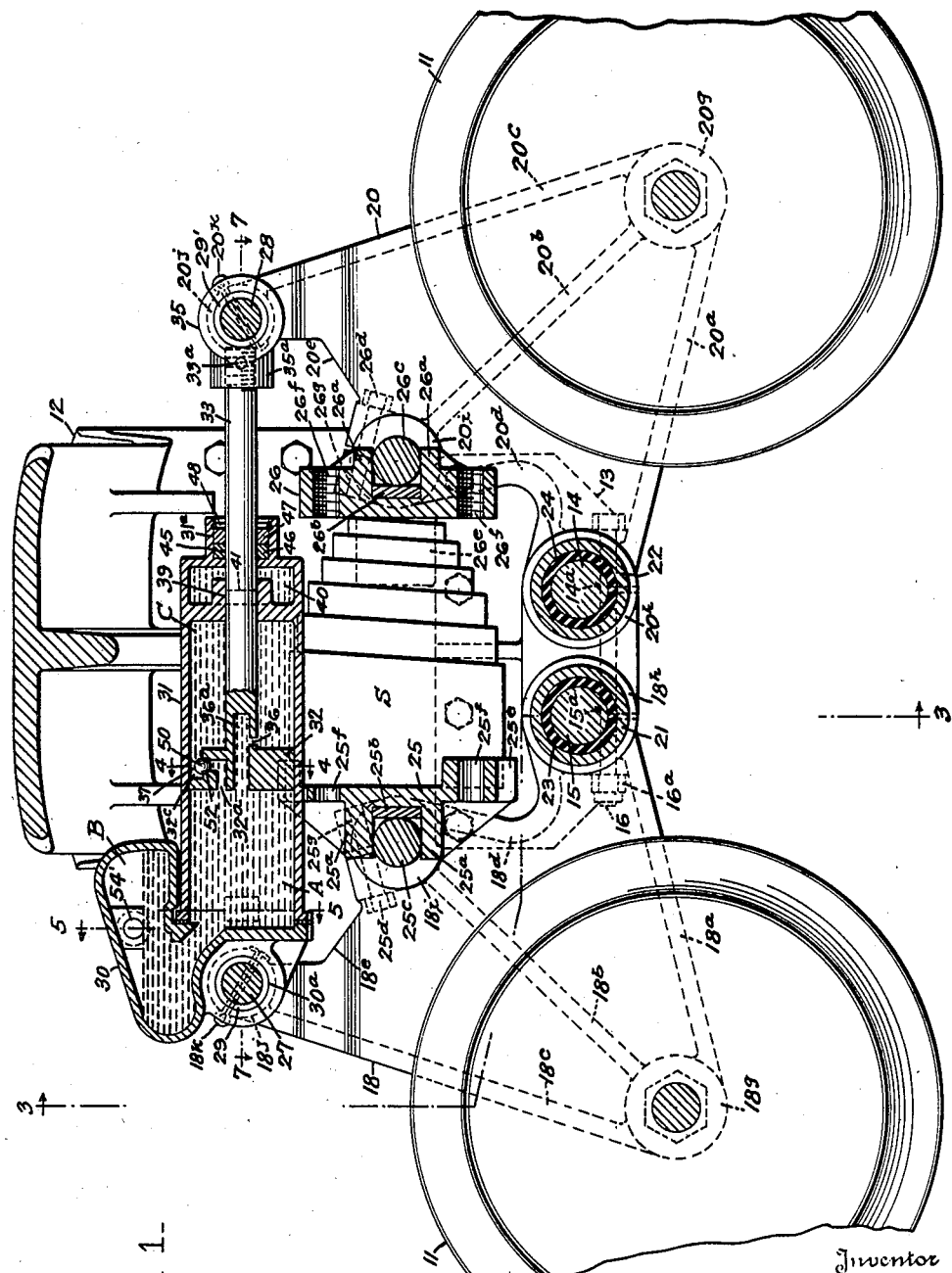
Fig. 1 is a sectional view taken substantially on line 1—1 of Fig. 2.

Referring to the drawings wherein like numerals designate like parts, the suspension is adapted to be rigidly fixed to a portion 10 of the vehicle frame and to carry a pair of wheels 11 resiliently.

The suspension proper is supported by two brackets 12, 13 which also serve to house the movable portions of the suspension. The brackets 12, 13 are rigidly interconnected by means of two shafts 14, 15 which have their ends rigidly fastened in split hollow portions 12a, 13a (Fig. 3) in the brackets 12, 13 respectively by means of clamping bolts 16 which pass through shaft grooves 14a, 15a. The split hollow bracket portions 12a, 13a are drawn up tight around the shafts 14, 15 by means of nuts 16a respectively; also, shaft grooves 14a, 15a cooperate with the body portion of bolts 16 so as to prevent rotation and axial movement of shafts 14, 15. The movable portions of the suspension are adapted to oscillate about the fixed shafts 14, 15.

The movable portion of the suspension may be considered to have four arms 17, 18, 19, 20 which are in pairs 17, 18, and 19, 20 so as to be disposed on opposite ends of the volute springs S, S'. Arm 17 is permanently joined to and spaced from arm 18 by means of a welded connection between those arms and tubular member 21; similarly arm 19 is permanently joined to and spaced from arm 20 by means of a welded connection between those arms and tubular member 22. Tubular members 21, 22 are adapted to receive shafts 15, 14 respectively and to be disposed between bracket abutments 12b, 13b. Elastic material 23, 24 such as rubber is disposed between shafts 14, 15 and tubular members 21, 22 in such a fashion, well understood in the art, that relative movement between the shafts and tubular members is accommodated by the resiliency of the material 23, 24 respectively.

Each of the arms 17, 18, 19, 20 are of similar construction and have members similar to those of 17a, 17b, 17c, 17d, 17e on arm 17; those members are lettered similarly to those of arm 17 in the drawings. Those members serve to join hollow portions similar to those of 17g, 17h, 17i and 17j in arm 17 in aligned relationship so that a shaft passing through one of the arm hollow portions will also pass through a corresponding hollow portion in the other arm which forms a pair with the last mentioned arm.

A pair of volute springs S, S' have their ends abutting against spring seats 25, 26 which have outside channel portions 25a, 26a adapted to receive flat contact bars 25b, 26b and cylindrical shafts 25c, 26c respectively. A line contact is thus provided between the last mentioned shafts and their contact bars and in case this line contact is impaired by wear or other causes a new one may be established by loosening clamping screws 25d, 26d which clamp split hollow arm portions 17i, 18i, 19i, 20i to the ends of shafts 25c, 26c respectively and then rotating the shafts a small amount; the split hollow portions are then reclamped to the ends of their shafts by screwing clamping screws 25d, 26d in tapped holes 25g, 26g. Tapped hole 25g is shown in section in Fig. 6 and of course tapped hole 26g is of similar structure.

Projections 26e (Fig. 1) on the spring seats 26 project into the hollow of the volute springs and together with flanges 25e (Fig. 3) on spring seat 25 maintain the volute springs S, S' in position. Tapped holes 26f (Fig. 1) in spring seat 26 are made of avail in assembling the suspension. An assembly rod (not shown) is adapted to pass through hole 25f in spring seat 25 and to screw in one of the tapped holes 26f in spring seat 26.

Features of the resilient suspension thus far described are disclosed in my copending application filed on the same date as the application of which this instant application is a division and also in my copending application, Serial No. 399,661, filed June 25, 1941. This instant application relates more particularly to the features of the hydraulic check in combination with the resilient suspension thus far described.

The hydraulic check assembly having hardened bushings 29, 29' integral therewith is centrally and rotatably mounted on shafts 27, 28 which are held fast in the arm hollow portions 17j, 18j and 19j, 20j by means of cotter pins 17k, 18k and 19k, 20k, respectively. The hydraulic check has three major parts, i. e., piston 32, the head or closure 30 and cylinder 31, and those latter two parts are clamped together by means of four circumferentially disposed bolts passing through four ears 31p on the cylinder 31 and engaging tapped portions in the head. A resilient oil resistant gasket may be interposed between those two major portions 30, 31 so as to provide a resilient connection therebetween. The head has a hollow portion 30a having the hardened bushing 29 fastened therein so as to provide a good wearing surface between shaft 27 and the head 30.

Piston 32 having a pair of ball check valves 37, 38 or similar closure members mounted therein is adapted to move with respect to its cylinder 31 when there is relative movement between the pair of arms 17, 18 and pair of arms 19, 20 since the cylinder 31 is rotatably mounted on arms 17, 18 and the piston rod is rotatably mounted on arms 19, 20 by means of a pin connection 33a between piston rod 33 and the hollow portion 35a of rotatable sleeve 35. A hardened bushing 29' fastened in sleeve 35 is adapted to rotate on hardened shaft 28.

Piston 32 has two types of fluid ports therein, i. e., a port 36 having a constant opening and ports of the type adapted to be open only when the wheels of the vehicle are quickly raised relative to one another. Two ball check valves 37, 38 are used in this particular embodiment of my invention although it is understood that under certain conditions one ball check valve having a larger ball therein may be substituted for the two ball arrangement disclosed, or more than two ball check valves may be disposed in the piston. It is desirable to use a plurality of small ball check valves instead of one large one for smooth operation for then the composite check valve structure has a smaller opening for a given displacement of the wheels.

The cylinder is filled with oil through an opening 54 in the cylinder head up to the level of the other opening 54' and it is seen that due to the shape of head 30 an air reservoir B is provided in the head when the opening 54 and overflow opening 54' are closed after the filling operation. Openings 54 and 54' are closed by means of the threaded bolts shown in Fig. 5. In operation of the piston, the oil from the left side of the piston (oil chamber) (Fig. 1) may either flow through control hole 36 via opening 36a or check valves 37, 38 to the right of the piston (compression chamber C) and, if oil leakage occurs between rod 33 and the snug fitting cylinder hole 39, the oil which leaks through 39 accumulates in cylinder hollow portion 40 from where it is returned to the left hand side of the piston through oil return port or conduit 41 (Fig. 7). The air reservoir B provided in the cylinder head serves as a cushion and an expansion chamber for the oil in the oil chamber A and the pressure developed therein upon movement of the piston to the left (Fig. 1) together with the stored energy in volute springs S, S' serve to return the piston 32 to the right; however, piston 32 moves to the right more slowly than when it moved to the left because ball check valves 37, 38 prevent the flow of oil to the oil chamber from the compression chamber C to the oil chamber A. The flow of oil from the compression chamber C to the oil chamber A occurs through control hole 36 via opening 36a but for any small undesired leakage through 39 and the ball check valves 37, 38. It is fundamental to realize that opening 36 may be made variable although the drawings show opening 36 to have a fixed opening.

An oiltight joint 45 is provided between the cylinder 31 and piston rod 33 at the place of emergence of the piston rod from the cylinder. This joint may be constructed in a manner well known in the art and the one shown herein comprises two oil retainer rings 46, 47 in the cylinder recess 31a. The retainer rings fill up the space between the cylinder and piston shaft 33 and are held in the cylinder recess by means of a ring 48.

It is noted that the pressure on the oiltight joint 45 never reaches the pressure in the compression chamber C because of the snug fit between piston rod 33 and cylinder hole 39, and the oil return port 41 (Fig. 7); accordingly an elaborate high pressure oiltight joint 45 is not necessary in order that there be no oil leakage from the oil cylinder to the outside.

Balls 50, 51 of check valves 37, 38 fit into rounded seats 52, 53 on the piston 33 so that passage of oil from compression chamber C to oil chamber A through ports 32a, 32b is prevented. The balls 50, 51 may move radially with respect to the cylinder 31 in the radial piston openings 32c and have their motion limited by the inner surface of cylinder 31. In order to remove the balls from the openings 32c it is necessary to separate the cylinder closure or head 30 from the cylinder 31 and move the piston 32 out of its cylinder 31 whereby the inner surface of the cylinder 31 no longer restrains the balls.

Suitable holes 12e, 13e are provided in brackets 12, 13 for fastening the brackets to a portion of the vehicle by means of bolts, or other similar means.

It is seen that a suspension and hydraulic check for two wheels of the vehicle are disclosed in the drawings in which the wheels have a common shock absorbing means; but, for purposes of analysis of one phase of applicant's invention, it is also seen that each wheel axle has an independent action even though the other wheel is held rigidly and considered to be a portion of the vehicle bracket.

Also, the wheel axles disclosed may rotate with the wheels or they may be held fast in their supporting frames.

The check valves 37, 38 are shown in the drawings as providing a check for the rapid return of the volute spring S, S' from a compressed position to a lesser compressed position. It is understood that the orifice 36 and the cylinder oil chamber B may be designed so that the time necessary for the spring to return to its less compressed position may be varied, i. e., orifice 36 may partake of an adjustable valve.

I claim:

In a machine having wheels mounted on axles and having a frame, means for pivotally mounting two wheel axles on the frame with their axes parallel, a spring between the two wheel axles and having two opposite ends movable with respect to one another, rigid means extending from one axle to one of said opposite ends and rigid means extending from the other axle to the other opposite end, a fluid cylinder, a piston in the fluid cylinder, a rigid arm extending from one axle to the cylinder and having pivotal connection with said cylinder, and rigid means extending from the other axle to the piston having pivotal connection with said piston.

HARRY A. KNOX.